United States Patent [19]

Welford

[11] Patent Number: 4,893,352
[45] Date of Patent: Jan. 9, 1990

[54] OPTICAL TRANSMITTER OF MODULATED SIGNALS

[75] Inventor: David Welford, Middleton, Mass.

[73] Assignee: Massachusetts Institute of Technology, Cambridge, Mass.

[21] Appl. No.: 68,233

[22] Filed: Jun. 30, 1987

[51] Int. Cl.[4] .............................................. H04B 9/00
[52] U.S. Cl. ....................................... 455/610; 370/2; 455/612; 455/616; 455/617; 455/619
[58] Field of Search .................. 370/2; 455/616, 611, 455/610, 612, 618, 617, 619; 350/96.12, 96.13; 356/349

[56] References Cited

U.S. PATENT DOCUMENTS

| | | | |
|---|---|---|---|
| 3,752,992 | 8/1973 | Fluhr | 455/611 |
| 4,447,116 | 5/1984 | King et al. | 350/96.13 |
| 4,681,395 | 7/1987 | Lindsay et al. | 455/612 |
| 4,684,207 | 8/1987 | Lawless | 350/96.13 |
| 4,755,016 | 7/1988 | DeLoach, Jr. et al. | 455/617 |

FOREIGN PATENT DOCUMENTS 0183502 6/1986 European Pat. Off. ............ 356/349
2141876 1/1985 United Kingdom ................ 455/612

Primary Examiner—Robert L. Griffin
Assistant Examiner—L. Van Beek
Attorney, Agent, or Firm—Hamilton, Brook, Smith & Reynolds

[57] ABSTRACT

Orthogonal optical signals on a common waveguide are obtained by power splitting a light signal into a split waveguide, modulating at least one of the split signals and recombining the signals. The orthogonal signals may be obtained by separating the signals in frequency or by quadrature encoding. Frequency translation may be obtained by continuously varying an applied voltage to vary the dielectric constant of a leg of the split waveguide. One of the signals may also be frequency, phase or amplitude modulated. This split waveguide may serve as the frequency shifter and modulator in a three-frequency heterodyne system.

27 Claims, 4 Drawing Sheets

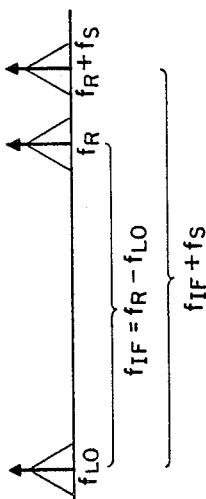
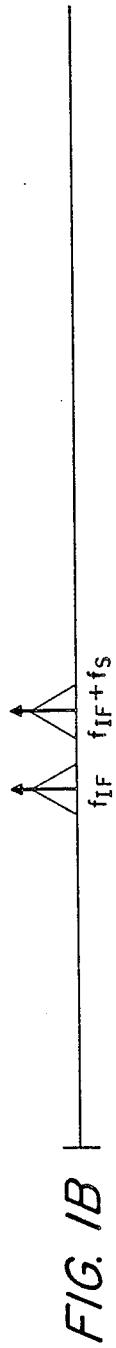
FIG. 1A
FIG. 1B
FIG. 1C

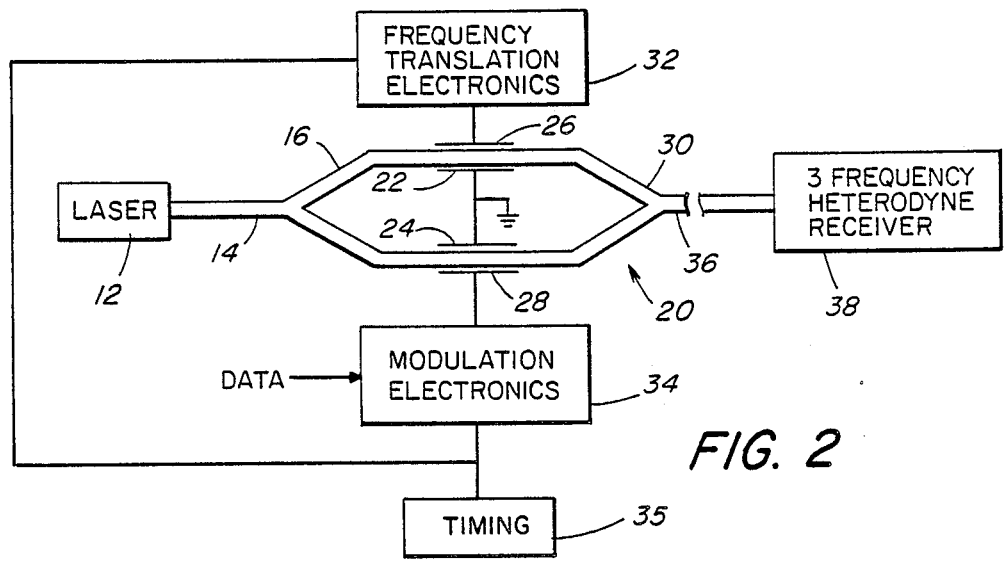
FIG. 2
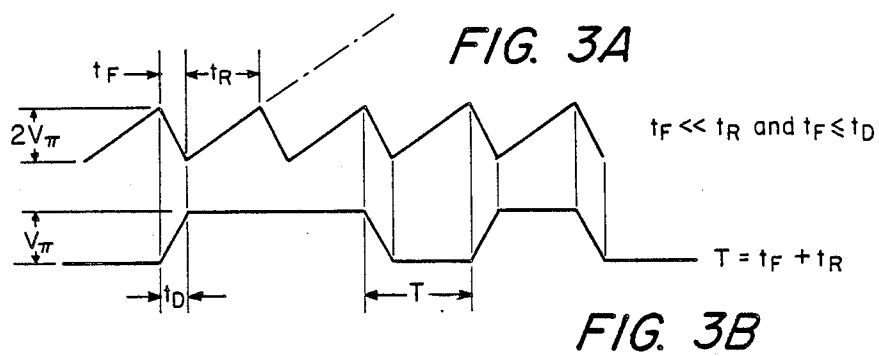
FIG. 3A
FIG. 3B
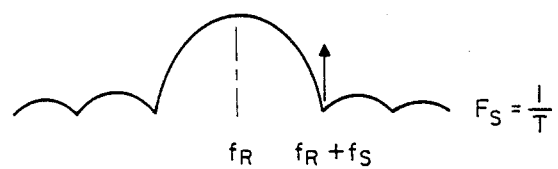
FIG. 3C

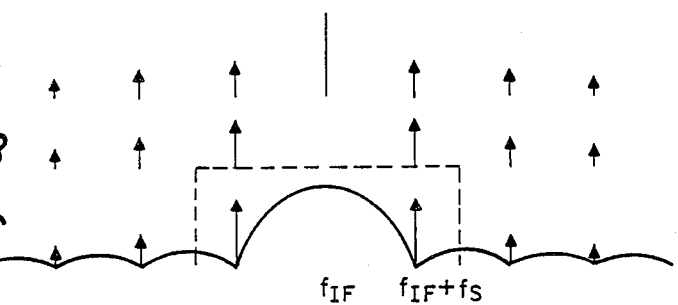
FIG. 4A
FIG. 4B
FIG. 4C
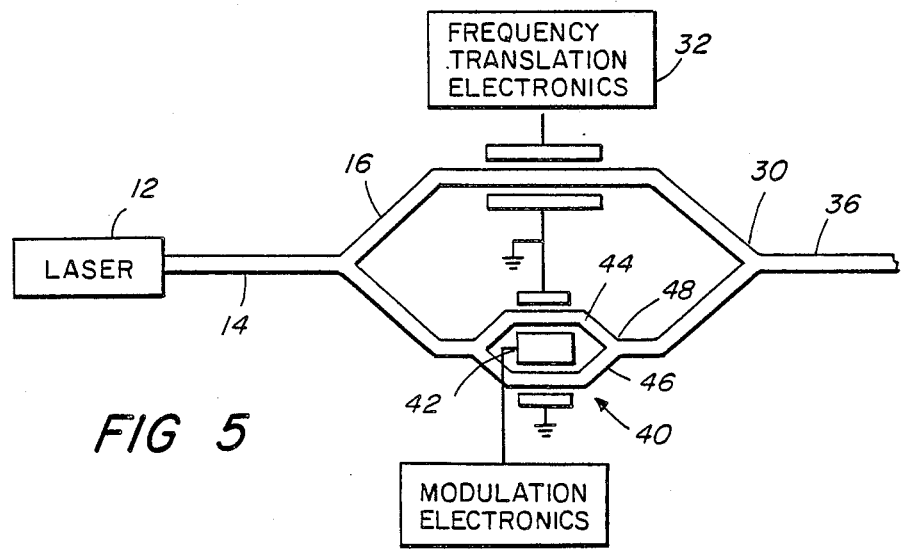
FIG 5
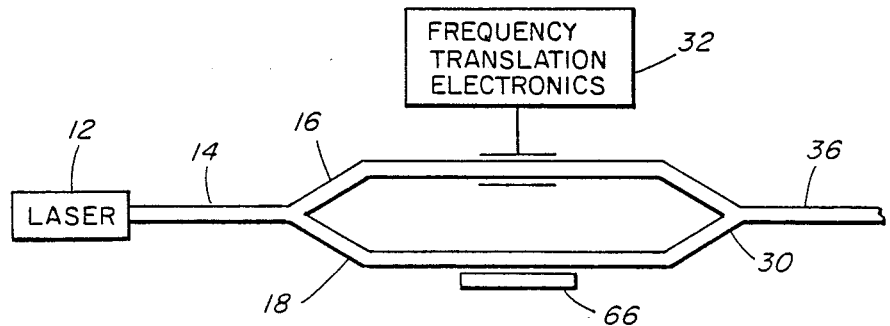
FIG. 9

OPTICAL TRANSMITTER OF MODULATED SIGNALS

GOVERNMENT SUPPORT

This work was sponsored by the Department of the Air Force.

BACKGROUND

Optical heterodyne communication systems using angle modulation generally degrade in the presence of frequency or phase noise related to the finite emission linewidths of the transmitter and local oscillator lasers. This is particularly severe for systems which use semiconductor diode lasers. A three frequency heterodyne technique has been proposed by Vincent Chan to cancel this effect: "Differential Frequency Modulation/Demodulation for Coherent Optical Communications," IEEE International Symposium on Information Theory, Brighton, England, June 23-25, 1985. Such a system has been demonstrated by Bondurant et al. in "Frequency Noise Cancellation in Semiconductor Lasers by Non-Linear Heterodyne Detection," *Optics Letters*, Vol 11, page 791, December 1986.

In the three frequency heterodyne system, a reference signal is transmitted with the modulated data carrying signal. These signals are derived from the same transmitter laser and are frequency shifted relative to each other. In FIG. 1A, the reference frequency is illustrated as the frequency $f_R$ of the laser and the carrier of the modulated signal is illustrated as $f_R + f_S$. No attempt is made in FIG. 1 to illustrate the frequency distribution of the modulated signal. Phase noise of the reference and carrier frequencies is illustrated. In the three frequency heterodyne technique, the third frequency $f_{LO}$ of a local oscillator is introduced at the receiver. That local oscillator signal is mixed with the incoming signal comprising $f_R$ and $f_R + f_S$ to produce two intermediate signals at frequency $f_{IF}$ and $f_{IF} + f_S$ where $f_{IF}$ equals $f_R - f_{LO}$. These two intermediate frequency signals carry identical phase noise originating from the transmitter laser and the local oscillator laser. By then mixing those two signals, a clean carrier signal without the noise from the laser and local oscillator is obtained at the difference frequency $f_S$, and noisy signals are obtained at twice the intermediate frequencies. The noisy signals can then be filtered out by a low-pass filter, and the data modulation signal at the carrier frequency $f_S$ can be obtained by use of a suitable demodulator.

Bondurant et al. demonstrated that the three frequency heterodyne detection scheme was feasible for optical systems. However, the transmitter, which utilized acousto-optic modulators, was impractical for large-scale applications due to its opto-mechanical alignment complexity and slow speed.

DISCLOSURE OF THE INVENTION

The present invention provides a device for generating orthogonal optical signals such that plural data signals or a data signal and a reference signal can be transmitted on a common waveguide. At least one of the signals may be displaced in frequency such that it has negligible energy in the original frequency range; so the device is suitable for use in a three frequency heterodyne system. An optical signal from a waveguide is split into plural signals by a waveguide power splitter. At least one of the split signals is then modulated, and the signals are recombined in a waveguide power combiner.

A signal may be displaced in frequency by a direct frequency shift or by a suppressed carrier modulation. At least one of the split signals may be phase, frequency or amplitude modulated by data prior to being recombined. The data may be from an electronic input or may be a sensed physical parameter. Preferably, the waveguide structure is the split waveguide structure used in a Mach-Zehnder waveguide interferometer.

A varying voltage may be applied to one leg of the split waveguide to cause a frequency displacement of the optical signal in that leg. A sawtooth waveform applied to a leg of the split waveguide, with transitions in the sawtooth occurring during data transitions, results in a simple shift in frequency of the optical signal. A more complex waveform such as a sine wave applied to the frequency shifting leg generates a set of frequency displaced signals, some of which may be filtered from the IF signal at the receiver.

Any number of data signal modulation techniques may be used. Frequency or phase modulation of the frequency displaced signal may be obtained by applying a more complex voltage signal to that waveguide leg, or the non-displaced signal my be frequency or phase modulated by a voltage applied to the other leg. As an example, phase shift keying may be obtained by applying a bilevel signal to one leg of the split waveguide. Alternatively, frequency shift keying may be obtained by controlling the frequency shift in one leg and leaving the signal in the other leg at the unshifted transmitter laser frequency. For amplitude modulation, one of the legs of the split waveguide may include a Mach-Zehnder interferometer

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1a, 1b and 1c are spectral illustrations of the laser signal, a frequency shifted carrier signal, a local oscillator signal and the results of mixing those signals;

FIG. 2 is, a schematic illustration of a three frequency heterodyne system incorporating the present invention;

FIGS. 3a, 3b and 3c illustrate possible phase shift keying data and serrodyne frequency shift drive signals to the system of FIG. 2 and the spectral output of the optical transmitter with those signals applied;

FIGS. 4a, 4b and 4c illustrates the spectral outputs of the frequency shifted leg of FIG. 2 with sine waves applied and its relationship to a data signal;

FIG. 5 illustrates a system having a Mach-Zehnder interferometer for amplitude modulation;

FIG. 9 illustrates an embodiment of the invention which responds to a sensed physical parameter.

DESCRIPTION OF PREFERRED EMBODIMENTS

Figure 6:
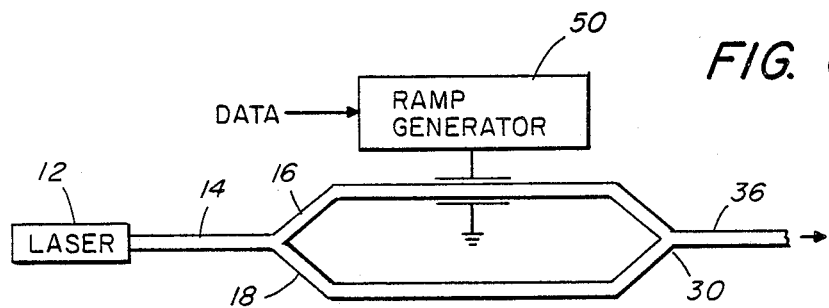
FIG. 6 illustrates a frequency shift key embodiment of the invention.

The three frequency heterodyne system of FIG. 2 utilizes a laser 12 as the light source. A diode laser is most compatible with current communications systems. The laser light is directed through a waveguide 14 which is preferably a diffused dielectric single mode waveguide. A variety of electro-optic dielectric waveguides have been fabricated. Materials employed include Ti:LiNbO$_3$, GaAs and its derivative GaInAsP, and CdTe. The dimensions of single mode waveguides are a function of the difference between the dielectric constants of the guide and its surroundings. For Ti:LiNbO$_3$, a guide's typical dimensions are three microns wide by three microns high for wavelengths of about 500 nanometers, and each of the dimensions scales linearly with light wavelength including infrared.

A laser signal at a carrier frequency $f_R$ in guide 14 is power split into plural waveguides. In this case, two legs 16 and 18 of a split waveguide structure 20 form the plural waveguides. The waveguide structure 20 is identical to that used in Mach-Zehnder interferometers but the drive electrodes and electronics differ. The propagation delay of a light signal through a dielectric waveguide may be modified by applying a voltage across the guide to thereby modify the dielectric constant. In the device of FIG. 2, electrodes 22 and 24 are formed adjacent to respective legs of the split waveguide and are connected to ground. The propagation delay of light through the leg 16 can be controlled by application of a voltage to the electrode 26, and the propagation delay through the leg 18 can be controlled by a voltage applied to the electrode 28. The split signals are then recombined in a power combiner 30.

In Mach-Zehnder interferometers, a phase shift between the split signals is caused. This results in amplitude modulation in the recombined signal in the output waveguide 36. However, by independently applying a continuously varying voltage to one leg of the split waveguide and thus continuously varying the phase shift, the signal in that waveguide leg can be frequency shifted to a frequency $f_R + f_S$ with negligible signal at $f_R$. That varying voltage is generated by the frequency translation electronics 32. In the device of FIG. 2, the signal in the other leg 18 remains at the laser frequency $f_R$ and is modulated by data applied through modulation electronics 34. The signal may, for example, be first phase shift of the signal and a second voltage for a second phase shift. In many systems, precise synchronization of the modulation and frequency translation signals is required, and such synchronization can be obtained by a common timing circuit 35.

The frequency shifted and modulated signals recombined in the power combiner 30 are directed through the transmission waveguide 36 to a receiver. The receiver 38 includes a local oscillator laser, detector and mixer such as that disclosed by Bondurant et al.

Possible signals to be applied from the frequency translation electronics and modulation electronics of FIG. 2 are illustrated in FIGS. 3A and 3B. A continuously varying voltage applied to a leg of the split waveguide causes the frequency translation. That signal might be generated by a single ramp illustrated by the broken lines of FIG. 3A. However, in practice the ramp would quickly reach a maximum allowable drive voltage. Therefore, it is preferred that the frequency translation be obtained by a sawtooth function as illustrated in FIG. 3A. Because the derivative of the voltage with time is the same in each rising portion of the sawtooth, the same frequency shift is obtained during each rising portion. During the transition time $t_F$ of the frequency translation signal, a different frequency translation would result. However, that transition period can be synchronized to data transition periods $t_D$, as illustrated in FIG. 3B, such that the undesired frequency shift only results during times that the data is not observed. Such an arrangement does require that the transition $t_F$ of the sawtooth be synchronized with and be less than or equal to the allowable transition time $t_D$ of the data.

Application of the bilevel signal of FIG. 3B to the leg 18 results in phase modulation of the signal. The spectral distribution envelope of the modulated signal is in the form of a sinc$^2$ function illustrated in FIG. 3C. The frequency shift $f_S$ of the reference signal may be sufficiently great that the shifted signal $f_R + f_S$ is well separated from the sinc signal. However, it is feasible to shift the reference signal only to the first null of the sinc signal as illustrated in FIG. 3C to obtain the needed orthogonal relationship between the signals. The combined signals of FIG. 3C are then transmitted to the three frequency heterodyne receiver, and the data is detected as previously illustrated with respect to FIG. 1.

It will be recognized that the frequency translation and modulation need not be performed in separate legs of the split waveguide. Rather, with a more complex signal applied to a single leg, the signal in that leg may be translated to $f_R + f_S$ and that translated signal may be modulated. The reference signal would remain at $f_R$.

Signals other than a sawtooth may be applied to obtain the frequency translation. For example, a sinusoidal voltage applied to a leg of the split waveguide will result in a set of signals displaced in frequency as illustrated in FIG. 4A. With suitable choice of drive signal, the center frequency is suppressed as illustrated in FIG. 4B so that negligible energy remains at the center frequency $f_R$. The spectral distributions of the set of frequency displaced signals and the sinc function envelope of the modulated signal can be oriented as illustrated in FIG. 4C. Then, at the receiver, an intermediate frequency band-pass filter having a response illustrated by the broken lines of FIG. 4C may be used to limit the signals entering the mixer to those within the first nulls of the modulated signal.

An applied voltage to a leg of the split waveguide results in either phase or frequency modulation. Amplitude modulation of the modulated signal may be obtained by further splitting one of the legs of the split waveguide in a Mach-Zehnder interferometer 40 shown in FIG. 5. In this additional interferometer, a common signal is applied to the internal electrodes 42 in a push-pull configuration to cause a relative phase shift between the signals in the legs 44 and 46. When recombined by the power combiner 48 of the interferometer, destructive interference results in a reduction in the amplitude of the signal. The thus amplitude modulated signal is then recombined with the frequency shifted signal in the power combiner 30 as before.

FIG. 6 illustrates a frequency shift key implementation of the present invention. In this embodiment, the signal on one leg 16 is frequency shifted by a ramp generator 50. The frequency shift is in response to a data input. In a binary FSK system, the frequency shifts from $f_R$ may be zero and some predetermined frequency or two frequencies other than zero. The non-modulated signal on the waveguide leg 18 again serves as a reference signal so that the data can be recovered in a three-frequency heterodyne system.

Figure 7:
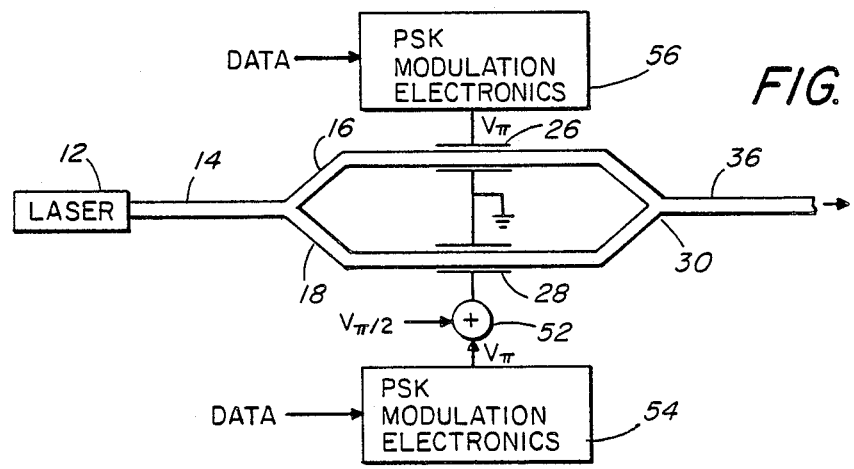
FIG. 7 illustrates a quadrature phase shift keying embodiment of the invention.

FIG. 7 illustrates an alternative system which does not rely on frequency shifting. FIG. 7 illustrates an implementation of a quadrature phase shift key system. The signal on the waveguide leg 18 is phase shifted 90° relative to the signal on the leg 16 by application of a DC voltage $V_{\pi/2}$ to the electrodes 28 through a summer 52. Phase shift keying of data onto that leg is obtained by electronics 54 which add to $V_{\pi/2}$ a signal which shifts between zero and $V_\pi$. Another set of data is applied to the electrode 26 through phase shift key modulation electronics 56. The combination of the DC offset applied to electrode 28 and the two PSK inputs to the electrodes 26 and 28 results in the signal on one of the legs being shifted between zero and 180° while the signal on the other leg is shifted between 90° and 270°. This creates an orthogonal sine/cosine relationship.

Figure 8:
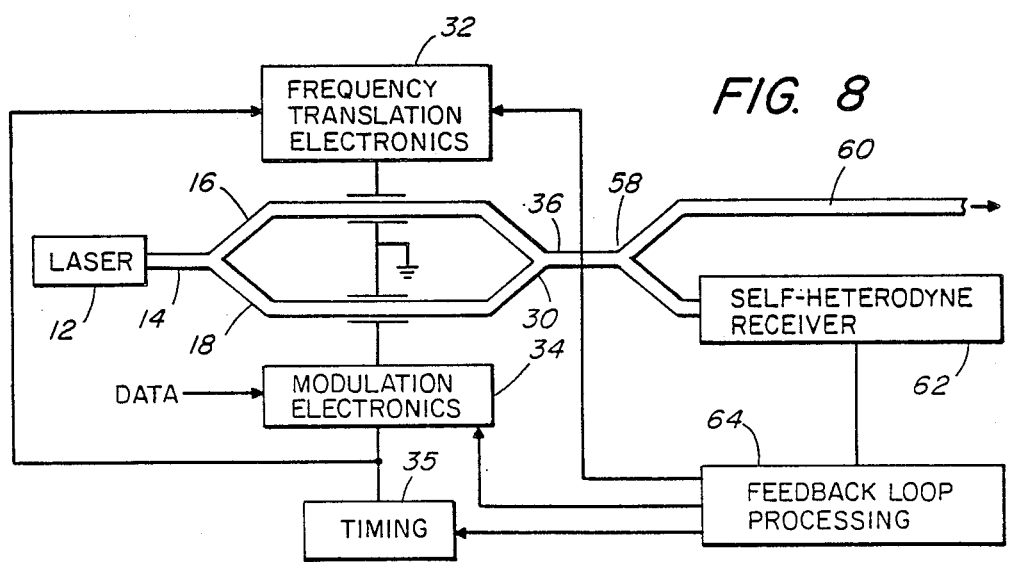
FIG. 8 illustrates an embodiment of the invention utilizing transmitter feedback.

The characteristics of the transmitter signal can be improved by providing a feedback network at the transmitter as illustrated in FIG. 8. In this system, the signal on the output waveguide 36 is split in a waveguide splitter 58. A large portion of the optical signal is transmitted through the communications waveguide 60 toward the receiver as before. However, part of the power is applied from the beam splitter 58 to a self-heterodyne receiver 62 at the transmitter. The receiver 62 self-heterodynes the signals at $f_R$ and $f_R + f_S$. The resultant intermediate frequency spectrum contains a signal which may be demodulated to provide electronic feedback to one or more of the frequency translation electronics, modulation electronics and timing electronics. Such feedback may improve the quality of the angle modulation and/or frequency shifts, eliminate long-term drift or instability in the electronics and simplify the implementation of particular angle modulation formats.

FIG. 9 illustrate a system in which the data modulation of the signal on one leg of the split waveguide is not obtained from an electronic source. Rather, the signal on leg 18 is responsive to the temperature of a heat sink 66 in thermal communication with the waveguide leg. The propagation delay of the signal of leg 18 is a function of the dielectric constant of the waveguide material which is in turn a function of temperature. Again, the signal on the leg 16 may be shifted in frequency by the frequency translation electronics 32.

While this invention has been particularly shown and described with references to preferred embodiments thereof, it will be understood by those skilled in the art that various changes in form and details may be made therein without departing from the spirit and scope of the invention as defined by the appended claims. For example, although only two legs are shown in the split waveguide, additional splitting may also be provided.

I claim:

1. An optical waveguide modulator comprising:
an input waveguide for carrying an input optical signal;
an optical waveguide splitter for splitting the power of the input optical signal into plural signals in plural waveguides;
modulator means for modulating at least one of the plural signals such that at least one of the plural signals has negligible energy in frequency ranges of all other plural signals; and
an optical combiner for combining the signals into an output optical waveguide.

2. An optical waveguide modulator as claimed in claim 1 wherein the waveguides are diffused dielectric waveguides and the modulator means comprises means for applying a voltage signal to at least one of the plural waveguides.

3. An optical waveguide modulator as claimed in claim 1 wherein the modulator means comprises means for generating a saw-toothed function in synchronization with data.

4. An optical waveguide modulator as claimed in claim 3 wherein the modulator means includes means for applying a bilevel digital signal to one of the plural waveguides in response to the data.

5. An optical waveguide modulator as claimed in claim 1 wherein the modulator means supplies a sinusoidal signal to one of the plural waveguides.

6. An optical waveguide modulator as claimed in claim 5 wherein the modulator means includes means for applying a bilevel digital signal to one of the plural waveguides in response to data.

7. An optical waveguide modulator as claimed in claim 1 herein the modulator means includes means for applying a bilevel digital signal to one of the plural waveguides in response to data.

8. An optical waveguide modulator as claimed in claim 1 wherein the modulator means further comprises a split waveguide interferometer in one of the plural waveguides.

9. An optical waveguide modulator as claimed in claim 1 wherein the data is a sensed physical parameter.

10. An optical waveguide modulator as claimed in claim 1 further comprising means for obtaining feedback from the combined signals and for processing the feedback to control the modulator means.

11. An optical modulator comprising:
a waveguide power splitter for splitting an input optical signal having an input frequency range from an input waveguide into plural signals in plural waveguides;
modulator means for generating a signal in one of the plural waveguides which is displaced in frequency relative to a signal in another of the waveguides and which has negligible energy in the input frequency range and for modulating the signal in one of the plural waveguides with data; and
a waveguide power combiner for combining plural signals from the plural waveguides, including the frequency displaced signal and data modulated signal, into a single waveguide.

12. An optical waveguide modulator as claimed in claim 11 wherein the waveguides are diffused dielectric waveguides and the modulator means comprises means for applying a voltage signal to at least one of the plural waveguides.

13. An optical waveguide modulator as claimed in claim 11 wherein separate ones of the plural signals in separate legs of the device are frequency displaced and modulated with data.

14. An optical waveguide modulator as claimed in claim 11 wherein the modulator means comprises means for generating a sawtooth function in synchronization with data with which a signal is modulated.

15. An optical waveguide modulator as claimed in claim 11 wherein the modulator means supplies a sinusoidal signal to one of the plural waveguides.

16. An optical waveguide modulator as claimed in claim 11 wherein the modulator means includes means for applying a bilevel digital signal to one of the plural waveguides.

17. An optical waveguide modulator as claimed in claim 11 wherein the modulator means comprises a split waveguide interferometer in one of the plural waveguides.

18. An optical waveguide modulator as claimed in claim 11 wherein the modulator means frequency modulates a signal in one of the plural waveguides with data.

19. An optical waveguide modulator as claimed in claim 11 wherein the data is a sensed physical parameter.

20. An optical waveguide modulator as claimed in claim 11 further comprising means for obtaining feedback from the combined orthogonal signals and for processing the feedback to control the modulator means.

21. A three-frequency heterodyne communication system comprising:
- a waveguide power splitter for splitting an optical signal from a waveguide into plural signals in plural waveguides;
- modulator means for generating a signal in one of the plural waveguides which is displaced in frequency relative to a signal in another of the waveguides and which has negligible energy in the input frequency range and for modulating the signal in one of the plural waveguides with data; and
- a waveguide power combiner for combining plural signals from the plural waveguides, including the frequency displaced signal and the data modulated signal, into a single waveguide; and
- three-frequency heterodyne receiver means for recovering data from the combined plural signals.

22. A three-frequency heterodyne communication system as claimed in claim 21 wherein the waveguides are diffused dielectric waveguides and the modulator means comprises means for applying a voltage signal to at least one of the plural waveguides.

23. A three-frequency heterodyne communication system as claimed in claim 21 wherein the modulator means comprises means for generating a sawtooth function in synchronization with the data.

24. A three-frequency heterodyne communication system as claimed in claim 21 wherein the modulator means applies a sinusoidal signal to one of the plural waveguides.

25. A three-frequency heterodyne communication system as claimed in claim 21 wherein the modulator means includes means for applying a bilevel digital signal to one of the plural waveguides.

26. A three-frequency heterodyne communication system as claimed in claim 21 wherein the modulator means comprises a split waveguide interferometer in one of the plural waveguides.

27. A method of modulating optical signals which are frequency shifted relative to each other comprising:
- power splitting a light signal into plural waveguides;
- varying the propagation delay through one of the plural waveguides to cause a frequency redistribution of the light in that waveguide relative to the light in another of the plural waveguides such that the light in that waveguide has negligible energy in the frequency range of light in the other waveguide;
- modulating the light in one of the waveguides with data; and
- combining the signals from the plural waveguides in a waveguide power combiner.

* * * * *